United States Patent
Dickman et al.

(10) Patent No.: US 9,156,547 B2
(45) Date of Patent: Oct. 13, 2015

(54) SYSTEM AND METHOD OF ACTUATING A SWASHPLATE FOR MAIN ROTOR CONTROL

(75) Inventors: Corey J. Dickman, Arlington, TX (US); Carlos A. Fenny, Arlington, TX (US); David P. Schultz, Grand Prairie, TX (US)

(73) Assignee: Textron Innovations Inc., Providence, RI (US)

( * ) Notice: Subject to any disclaimer, the term of this patent is extended or adjusted under 35 U.S.C. 154(b) by 841 days.

(21) Appl. No.: 13/370,130

(22) Filed: Feb. 9, 2012

(65) Prior Publication Data

US 2013/0209252 A1 Aug. 15, 2013

(51) Int. Cl.
*F01D 7/00* (2006.01)
*B64C 27/605* (2006.01)
*F15B 18/00* (2006.01)

(52) U.S. Cl.
CPC ............... *B64C 27/605* (2013.01); *F15B 18/00* (2013.01)

(58) Field of Classification Search
CPC ........ B64C 27/00; B64C 27/04; B64C 27/12; B64C 27/72; B64C 27/605; B64C 2027/004; B64C 2027/7238; B64C 2027/7244; B64C 2027/7255
USPC ....... 416/168 R, 114, 108, 18, 147; 244/99.2, 244/99.5, 99.6
See application file for complete search history.

(56) References Cited

U.S. PATENT DOCUMENTS

| 3,411,410 | A | | 11/1968 | Westbury et al. |
| 4,379,678 | A | * | 4/1983 | Carlock et al. .................. 416/98 |
| 7,003,949 | B2 | | 2/2006 | Fenny et al. |
| 2008/0185476 | A1 | | 8/2008 | Suisse et al. |
| 2010/0084517 | A1 | | 4/2010 | Benson et al. |

FOREIGN PATENT DOCUMENTS

DE 102010025718 A1 1/2012

OTHER PUBLICATIONS

Extended European Search Report from application 12159732.2-2422. Issued from the European Patent Office dated May 25, 2012, 7 pages.
Canadian Examination Report in related Canadian patent application No. 2,803,705, 4 pages, mailed Mar. 31, 2014.

(Continued)

*Primary Examiner* — Edward Look
*Assistant Examiner* — Maxime Adjagbe
(74) *Attorney, Agent, or Firm* — James E. Walton; Damon R. Hickman

(57) ABSTRACT

The main rotor control system includes a rise/fall swashplate assembly that is coupled to three triplex actuators. The swashplate assembly is configured to provide full collective and cyclic pitch controls. Each triplex actuator includes three piston/cylinder assemblies in parallel. Selective actuation of each triplex actuator is controlled by a fly-by-wire system in conjunction with three flight control computers and three hydraulic power packs. Integrated three function valves can be associated with an individual manifold for each piston/cylinder assembly of each triplex actuator, the integrated three function valve be configured to insure safe operation of the triplex actuator during a failure of a certain piston/cylinder assembly.

14 Claims, 2 Drawing Sheets

(56) References Cited

OTHER PUBLICATIONS

European Office Action in related European patent application No. 12159732.2, mailed Oct. 10, 2013, 5 pages.

Fenny, Carlos A.; Schultz, David P. "Design and Development of the BA 609 Civil Tiltrotor Hydraulic System Architecture" American Helicopter Society International, United States, Copyright 2005, 21 pages.

* cited by examiner

SYSTEM AND METHOD OF ACTUATING A SWASHPLATE FOR MAIN ROTOR CONTROL

BACKGROUND

1. Technical Field

The present application relates in general to a control system for an aircraft. More specifically, the present application relates to a main rotor control system for a rotorcraft.

2. Description of Related Art

Typically, rotorcraft main control systems are designed with many factors in consideration. One conventional main rotor system uses a plurality of mechanical linkages in conjunction with hydraulic actuators to selectively impart pitch control inputs in the rotor system. Although the foregoing represents a significant technology in the area main rotor control, significant room for improvement remains.

DESCRIPTION OF THE DRAWINGS

The novel features believed characteristic of the embodiments of the present application are set forth in the appended claims. However, the embodiments themselves, as well as a preferred mode of use, and further objectives and advantages thereof, will best be understood by reference to the following detailed description when read in conjunction with the accompanying drawings, wherein:

DESCRIPTION OF THE PREFERRED EMBODIMENT

Illustrative embodiments of the system and method of the present application are described below. In the interest of clarity, not all features of an actual implementation are described in this specification. It will of course be appreciated that in the development of any such actual embodiment, numerous implementation-specific decisions must be made to achieve the developer's specific goals, such as compliance with system-related and business-related constraints, which will vary from one implementation to another. Moreover, it will be appreciated that such a development effort might be complex and time-consuming but would nevertheless be a routine undertaking for those of ordinary skill in the art having the benefit of this disclosure.

In the specification, reference may be made to the spatial relationships between various components and to the spatial orientation of various aspects of components as the devices are depicted in the attached drawings. However, as will be recognized by those skilled in the art after a complete reading of the present application, the devices, members, apparatuses, etc. described herein may be positioned in any desired orientation. Thus, the use of terms such as "above," "below," "upper," "lower," or other like terms to describe a spatial relationship between various components or to describe the spatial orientation of aspects of such components should be understood to describe a relative relationship between the components or a spatial orientation of aspects of such components, respectively, as the device described herein may be oriented in any desired direction.

Figure 1:
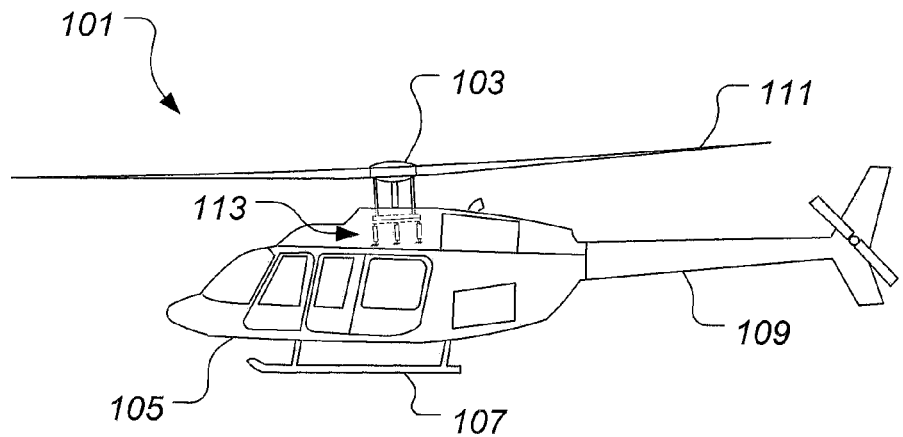
FIG. 1 is a side view of a rotorcraft, according to an embodiment of the present application.

Referring to FIG. 1 in the drawings, a rotorcraft 101 is illustrated. Rotorcraft 101 has a rotor system 103 with a plurality of rotor blades 111. Rotorcraft 101 further includes a fuselage 105, landing gear 107, and an empennage 109. A main rotor control system 113 can be used to selectively control the pitch of each rotor blade 111 in order to selectively control direction, thrust, and lift of rotorcraft 101, as discussed further herein. It should be appreciated that even though main rotor control system 113 is depicted on a rotorcraft 101 that has certain illustrated features, it should be appreciated that main rotor control system 113 can be implemented on other rotorcraft and rotorcraft configurations, as one of ordinary skill in the art would fully appreciate having the benefit of this disclosure. Further, it should be appreciated that main rotor control system 113 can be implemented to control a variety of rotor blade quantities.

Figure 2:
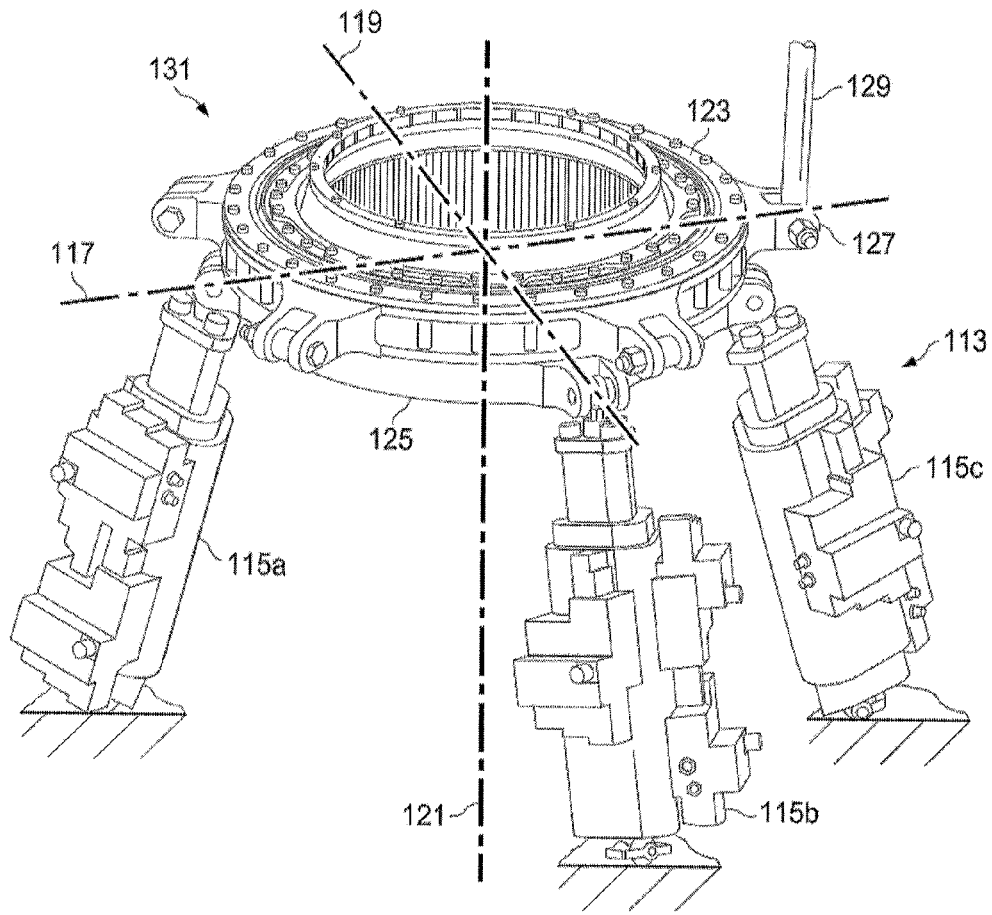
FIG. 2 is a perspective view of a main rotor control system, according to an embodiment of the present application.

Referring now also to FIG. 2, main rotor control system 113 is illustrated in further detail. Control system 113 includes three triplex actuators 115a-115c coupled to a rise/fall swashplate assembly 131. Swashplate assembly 131 includes a rotating swashplate ring 123 and a non-rotating swashplate ring 125. Rotating swashplate ring 123 has a plurality of pitch-link attachment members 127, each being configured for attaching a pitch-link 129 (only one illustrated for clarity). Each pitch-link 129 is coupled between rotating swashplate ring 123 and a pitch horn member of a rotor blade, such as rotor blade 111. As such, a quantity of pitch-link attachment members 127 corresponds with the number of rotor blades 111. Preferably, pitch-link attachment members 127 are located equidistant around the perimeter of rotating swashplate ring 123. Rotor mast (not shown for clarity) is coupled to the rotating swashplate ring 123 via a spline, the rotational axis of the mast being mast axis 121.

Still referring to FIG. 2, non-rotating swashplate ring 125 is configured to receive actuation inputs from triplex actuators 115a-115c, and mechanically transfer said inputs into rotating swashplate ring 123 via a bearing assembly. Each triplex actuator 115a-115c is coupled to non-rotating swashplate ring 125 at an individual location. In the illustrated embodiment, the three attachment locations on non-rotating swashplate ring 125 are located at non-uniform spacing intervals about the mast axis; however, in an alternative embodiment the three attachment locations are equidistant 120° spaced locations about the mast axis. Control system 113 is configured such that triplex actuators 115a-115c are selectively actuated to provide full collective and cyclic movements of rotating swashplate ring 123. A collective input from triplex actuators 115a-115c translates swashplate assembly 131 substantially along mast axis 121 so as to uniformly change the pitch of each rotor blade through a corresponding pitch link 129. A cyclic input selectively tilts swashplate assembly 131 about a lateral tilt axis 117, a longitudinal tilt axis 119, or any combination thereof. It should be appreciated that the exact orientation of lateral tilt axis 117 and longitudinal tilt axis 119 in relation to an axis of the aircraft is implementation specific. It should be fully appreciated that full cyclic and collective movements of swashplate assembly 131 are actuated by triplex actuators 115a-115c. A lower portion of each triplex actuator 115a-115c is coupled to a fixed portion of rotorcraft 101, such as a gearbox, pylon mount, or roof deck, to name a few examples.

Still referring to FIG. 2, triplex actuators 115a-115c are controlled in a fly-by-wire flight control configuration. Flight control inputs from a pilot are converted to actuation inputs to triplex actuators 115a-115c in order to cause selective actuation of rise/fall swashplate assembly 131. In an alternative embodiment, an unmanned flight control system is used in lieu of the pilot. When a collective input is made, each triplex actuator 115a-115c is actuated to translate rise/fall swashplate assembly 131 uniformly upwards or downwards along mast axis 121, thereby uniformly increasing or decreasing the pitch of each rotor blade 111. When a cyclic input is made, triplex actuators 115a-115c are actuated to cause a tilting of rise/fall swashplate assembly 131 about lateral tilt axis 117, longitudinal tilt axis 119, or any combination of tilting about lateral tilt axis 117 and longitudinal tilt axis 119. Because the cyclic input can be made to tilt rise/fall swashplate assembly 131 about lateral tilt axis 117 as well as longitudinal tilt axis 119, a variety of flight maneuvers can be realized, such as a change in rotorcraft pitch and roll, as well as combinations thereof.

Figure 3:
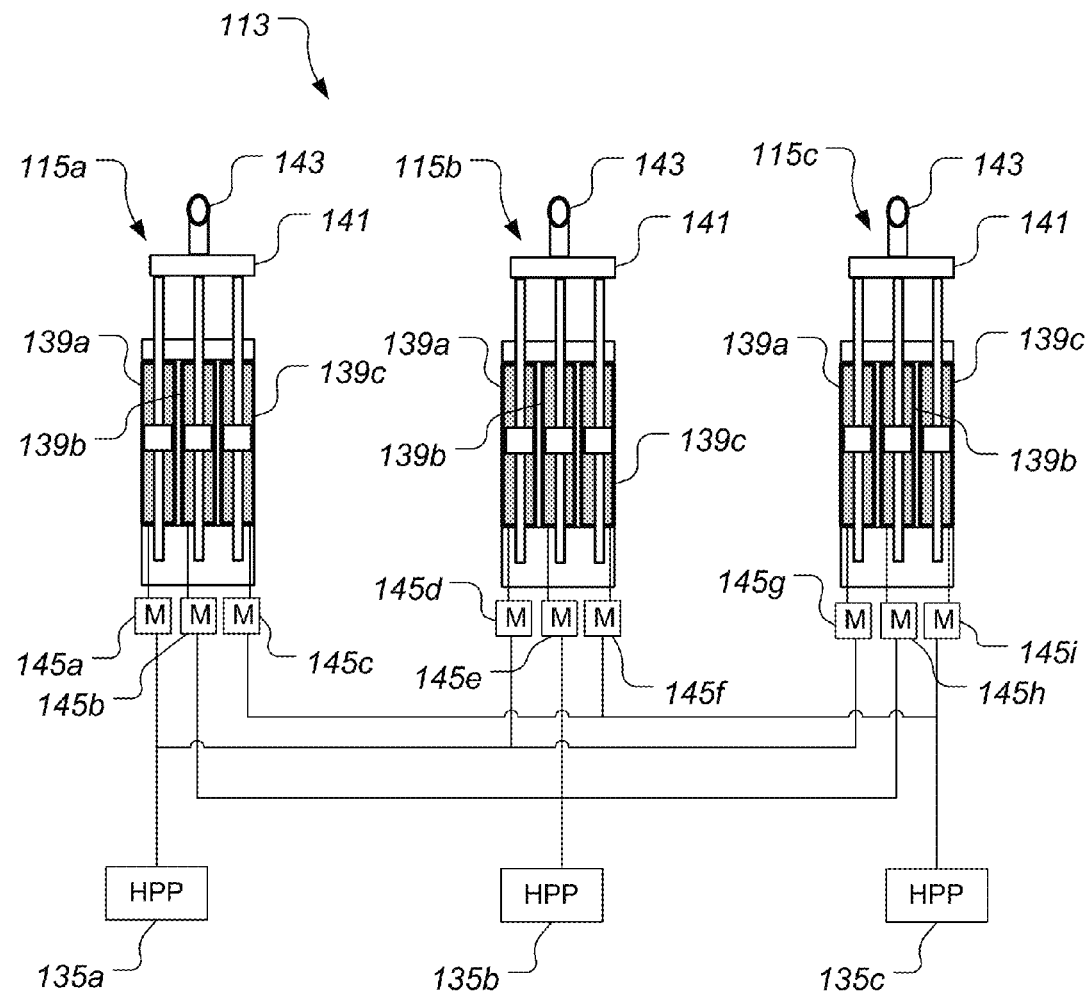
FIG. 3 is a schematic view of the main rotor control system, according to an embodiment of the present application.

Referring now also to FIG. 3, main rotor control system 113 is schematically illustrated. Each triplex actuator 115a, 115b, and 115c include three separate piston/cylinder assemblies 139a-139c. Each piston/cylinder assembly 139a-139c is coupled to a yoke 141. Yoke 141 is coupled to a rod end 143 configured for coupling to non-rotating swashplate ring 125. Triplex actuator 115a has a manifold 145a-145c associated with each piston/cylinder assembly 139a-139c, respectively. Similarly, triplex actuator 115b has a manifold 145d-145f associated with each piston/cylinder assembly 139a-139c, respectively. Further, triplex actuator 115c has a manifold 145g-145i associated with each piston/cylinder assembly 139a-139c, respectively. Manifolds 145a, 145d, and 145g are in hydraulic communication with a hydraulic power pack (HPP) 135a. Manifolds 145b, 145e, and 145h are in hydraulic communication with a hydraulic power pack (HPP) 135b. Manifolds 145c, 145f, and 145i are in hydraulic communication with a hydraulic power pack (HPP) 135c. Each piston/cylinder assembly 139a-139c is hydraulically actuated in parallel so that the rod member in each piston/cylinder assembly 139a-139c can be translated in parallel. Hydraulic power packs 135a-135c are each independent hydraulic systems configured to collectively provide redundancy. Each hydraulic power pack 135a-135c includes a pump and reservoir in one package.

A flight control computer (FCC) is preferably associated with a single manifold of each triplex actuator, for control thereof. For example, a first of three FCC's can be associated with manifolds 145a, 145d, and 145g. Similarly, the second of three FCC's can be associated with manifolds 145b, 145e, and 145h. Further, the third of three FCC's can be associated with manifolds 145c, 145f, and 145i. It should be appreciated that the above combinations are exemplary of wide variety of FCC and manifold combinations. One important feature is that each FCC controls a single manifold on each triplex actuator.

Figure 4:
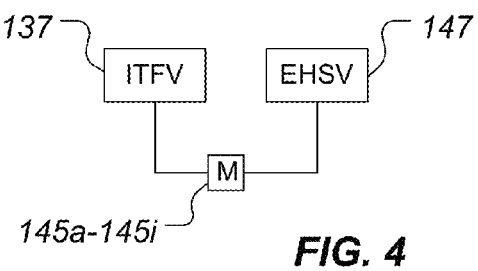
FIG. 4 is a schematic view of a manifold member of the main rotor control system, according to an embodiment of the present application.

Referring now also to FIG. 4, a manifold is schematically illustrated. Each manifold 145a-145i preferably includes an integrated three function valve (ITFV) 137 configured to allow triplex actuator 115a to operate even after a failure of one or two of piston/cylinder assemblies 139a-139c. For example, ITFV 137 can be used to quickly inert a malfunctioning piston/cylinder assembly, such as piston/cylinder assembly 139a, so that the remaining healthy piston/cylinder assemblies 139b and 139c can continue to operate without fighting piston/cylinder assembly 139a. Further, ITFV 137 allows a single piston/cylinder assembly to be in bypass while allowing the triplex actuator to be supplied energy via the other two hydraulic power packs. Further, each ITFV allows the remaining two triplex actuators to function with all three hydraulic power packs 135a-135c. Each manifold 145a-145i preferably also includes an electro-hydraulic servo-valve (EHSV) 147. An ITFV and EHSV are disclosed in U.S. Pat. No. 7,003,949, titled "Integrated Three Function Valve," issued 28 Feb. 2006, to Fenny, et al. (Fenny '949). Fenny '949 is incorporated herein by reference.

A main rotor control system 113 having triplex actuators 115a-115c in conjunction with rise/fall swashplate assembly 131 provides a novel arrangement with distinct advantages. One advantage is that the flight control computers (FCC's) in a fly-by-wire control system can be prone to undesired glitches and/or failures, as compared to conventional mechanical systems. As such, an increased safety is realized in triplex actuators 115a-115c, with each having three parallel piston/cylinder assemblies 139a-139c. The failure of a single piston/cylinder assembly only results in a ⅓ loss of power in the triplex actuator. Further, each piston/cylinder assembly 139a-139c within an individual triplex actuator is separately powered by a hydraulic power pack (HPP), thus further realizing an increased level of safety. Further, rise/fall swashplate assembly 131 increases the efficiencies of main rotor control system 113 by providing full collective and cyclic pitch control capabilities. Each triplex actuator 115a-115c is coupled between non-rotating swashplate ring 125 and a stationary structure, thus eliminating the need for heavy critical parts and linkages, the failure of which could be catastrophic.

The particular embodiments disclosed above are illustrative only, as the application may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope and spirit of the application. Accordingly, the protection sought herein is as set forth in the claims below. It is apparent that a system with significant advantages has been described and illustrated. Although the system of the present application is shown in a limited number of forms, it is not limited to just these forms, but is amenable to various changes and modifications without departing from the spirit thereof.

The invention claimed is:

1. A main rotor control system for a rotorcraft, the main rotor control system comprising:
a swashplate assembly having a non-rotating ring and a rotating ring;
a first triplex actuator coupled between the non-rotating ring and a rotorcraft structure;
a second triplex actuator coupled between the non-rotating ring and the rotorcraft structure;
a third triplex actuator coupled between the non-rotating ring and the rotorcraft structure;
wherein the first triplex actuator, the second triplex actuator, and the third triplex actuator each have a first piston/cylinder assembly comprising a first piston configured to selectively translate along a first direction, a second piston/cylinder assembly comprising a second piston configured to selectively translate along the first direction, and a third piston/cylinder assembly comprising a third piston configured to selectively translate along the first direction, the first piston/cylinder assembly, the second piston/cylinder assembly, and the third piston/cylinder assembly being in a parallel configuration so that the first piston, the second piston and the third piston are disposed side-by side along a direction substantially orthogonal relative to the first direction, and wherein the first piston, the second piston, and the third piston are mechanically linked so that translation of any one of the first piston, the second piston, and the third piston along the first direction results in substantially the same translation of a remaining two of the first piston, the second piston, and the third piston;

wherein the swashplate assembly is configured to tilt about a longitudinal axis and a lateral axis in response to a cyclic input; and wherein the swashplate is configured to translate along a mast axis in response to a collective input.

2. The main rotor control system according to claim 1, further comprising:

a manifold associated with each of the first piston/cylinder assembly, the second piston/cylinder assembly, and the third piston/cylinder assembly, each manifold having an integrated three function valve.

3. The main rotor control system according to claim 1, further comprising:

a first hydraulic power pack in fluid communication with the first piston/cylinder assembly of the first triplex actuator, the first piston/cylinder assembly of the second triplex actuator, and the first piston/cylinder assembly of the third triplex actuator.

4. The main rotor control system according to claim 1, further comprising:

a manifold associated with each of the first piston/cylinder assembly, the second piston/cylinder assembly, and the third piston/cylinder assembly, each manifold having an electro-hydraulic servo-valve.

5. The main rotor control system according to claim 1, further comprising:

a pitch link coupled between a rotor blade and the rotating ring.

6. The main rotor control system according to claim 2, wherein the integrated three function valve in the manifold is configured to inert the piston/cylinder assembly associated therewith, when the piston/cylinder is malfunctioning.

7. A method of controlling a main rotor hub system, the method comprising:

actuating a first triplex actuator, a second triplex actuator, and a third triplex actuator; the first triplex actuator, the second triplex actuator, and the third triplex actuator being coupled between a swashplate assembly and a structure on a rotorcraft;

wherein the step of actuating the first triplex actuator, the second triplex actuator, and the third triplex actuator is achieved with a hydraulic system; and wherein the first triplex actuator comprises a first piston/cylinder assembly, the second triplex actuator comprises a second piston/cylinder assembly, and the third triplex actuator comprises a third piston/cylinder assembly and wherein each of the first piston/cylinder assembly, the second piston/cylinder assembly, and the third piston/cylinder assembly comprise three pistons configured for selective translation along a first direction, the three pistons being mechanically linked so that translation of any one of the three pistons results in substantially the same translation of a remaining two of the three pistons, the three pistons being disposed parallel relative to each other and side-by side along a direction substantially orthogonal relative to the first direction.

8. The method according to claim 7, wherein the step of actuating the first triplex actuator, the second triplex actuator, and the third triplex actuator acts to tilt the swashplate assembly about a longitudinal axis.

9. The method according to claim 7, wherein the step of actuating the first triplex actuator, the second triplex actuator, and the third triplex actuator acts to tilt the swashplate assembly about a lateral axis.

10. The method according to claim 7, wherein the step of actuating the first triplex actuator, the second triplex actuator, and the third triplex actuator acts to translate the swashplate assembly along a mast axis.

11. The method according to claim 7, wherein each of the first piston/cylinder assembly, the second piston/cylinder assembly, and the third piston/cylinder assembly comprise a manifold associated therewith, each manifold having an integrated three function valve.

12. The method according to claim 11, further comprising:

inserting one of the first piston/cylinder assembly, the second piston/cylinder assembly, and the third piston/cylinder assembly with the integrated three function valve.

13. The method according to claim 7, wherein the hydraulic system includes a hydraulic power pack associated with a single piston/cylinder assembly in each of the first triplex actuator, the second triplex actuator, and the third triplex actuator.

14. The method according to claim 7, wherein the step of actuating the first triplex actuator, the second triplex actuator, and the third triplex actuator is further achieved through control inputs from a first flight control computer, a second flight control computer, and a third flight control computer, wherein each of the first flight control computer, the second flight control computer, and the third flight control computer is associated with an individual manifold of each of the first triplex actuator, the second triplex actuator, and the third triplex actuator.

* * * * *